Dec. 9, 1969 B. E. DANIELSEN ET AL 3,482,842

RECORD AND RANDOM PLAYBACK MECHANISM THEREFOR

Filed Jan. 22, 1968 3 Sheets-Sheet 1

INVENTORS
BERNE E. DANIELSEN
REGINALD M. DOWSING
MELVIN R. KENNEDY
JOHN W. RYAN

BY Herzig, Walsh & Blackham
ATTORNEYS

INVENTORS
BERNE E. DANIELSEN
REGINALD M. DOWSING
MELVIN R. KINNEDY
JOHN W. RYAN

BY Herzig, Walsh & Blackham
ATTORNEYS

RECORD AND RANDOM PLAYBACK MECHANISM THEREFOR

Filed Jan. 22, 1968 3 Sheets-Sheet 3

INVENTORS
BERNE E. DANIELSEN
REGINALD M. DOWSING
MELVIN R. KENNEDY
JOHN W. RYAN

BY Herzig, Walsh & Blackham
ATTORNEYS

United States Patent Office 3,482,842

Patented Dec. 9, 1969

3,482,842
RECORD AND RANDOM PLAYBACK MECHANISM THEREFOR

Berne E. Danielsen, Pacific Palisades, Reginald M. Dowsing, Torrance, Melvin R. Kennedy, Compton, and John W. Ryan, Los Angeles, Calif., assignors to Mattel, Inc., Hawthorne, Calif., a corporation of California Filed Jan. 22, 1968, Ser. No. 699,653
Int. Cl. G11b *25/06*
U.S. Cl. 274—11 16 Claims

ABSTRACT OF THE DISCLOSURE

The record is a flexible endless record tape or band which has a plurality of parallel sound tracks over substantially the entire length thereof. At the juncture between the beginning and ends of these sound tracks a transition section means or guide track means cooperates with all of the sound tracks to carry the stylus to one side of the record. At least one hole is punched through the record where the guide track is at one side of the record.

The random playback mechanism has a stylus which is continuously engaged in either one of the sound tracks or the guide track, depending upon its relative position. During normal play it is in one of the sound tracks, and when the end of play is reached, the guide track carries the stylus to one side. A pin engages the hole in the record, which pin is connected to a pawl which spins a random cam. The cam acts as a stop for transverse motion of the stylus as it is moving out of the guide track into one of the sound tracks so that, as the stylus engages the cam as a stop, the next sound track to be played is randomly selected.

BACKGROUND OF THE INVENTION

There are a number of situations in which its desirable to select on a random basis one of a plurality of sound tracks, to randomly reproduce the sound recorded thereon. One of these situations arises in toys and the like, where it is desirable to produce a random sound, to make the toy more realistic.

SUMMARY OF THE INVENTION

In order to understand the record and playback mechanism therefor of this invention, it can be stated in essentially summary form that it is directed to an endless recorded message carrier or record which has a plurality of independent sound tracks thereon, which sound tracks are joined between the beginning and ends thereof by a single guide track, so that after any sound track is played, the stylus is led into the guide track. In the area of the guide track, physical signalling means indicates the position of the record to the playback mechanism. The playback mechanism responds to this physical signalling means, randomly spins a stylus-track-selecting cam and, if desired, stops the playback by the playback mechanism. Upon restarting, a cam follower upon the stylus engages the track selecting cam, which has been randomly spun to a new position, so that upon continued motion of the record, the stylus follows the guide track until its cam follower engages the cam. Thereupon, it follows the selected sound track. The playback mechanism includes record drive means which is preferably controllable to stop the record when the signalling means so indicates, and is restartable to play a randomly selected sound track on the record until the guide track is again reached.

Accordingly, it is an object of this invention to provide a record which has a plurality of separate sound tracks and which has a single guide track which guides the stylus from any one of the sound tracks to an inter-connecting position, and guides the stylus to the starting ends of all of the sound tracks.

It is another object of this invention to provide a record which has a physical signalling means thereon between the end and beginning of a plurality of separate sound tracks so that the random playback mechanism associated with the record can randomly select the next sound track to be played.

It is another object of this invention to provide a random playback mechanism for a record having a plurality of selectable sound tracks thereon, which random playback mechanism includes record position detecting means which detects the record position when the record is between sound tracks to be played.

It is still another object to provide such a random playback mechanism with a random selecting device which selects at random which sound track is to be played.

It is still another object of this invention to provide the random playback mechanism with a cam which is randomly spun to a new position, which can act as a stylus stop so that, as the stylus is guided upon the guide track of the record, the engagement of the stop with the random cam randomly selects a sound track to be played.

It is still another object of this invention to provide a random playback mechanism which includes a pin which engages in a hole provided in the record adjacent the guide track, which pin is mounted upon a cam driver so that record motion moves the cam to a randomly-selected new position.

Other objects and advantages of this invention will become apparent from a study of the following portion of this specification, the claims and the attached drawings.

DESCRIPTION OF THE PREFERRED EMBODIMENTS

Figure 7:
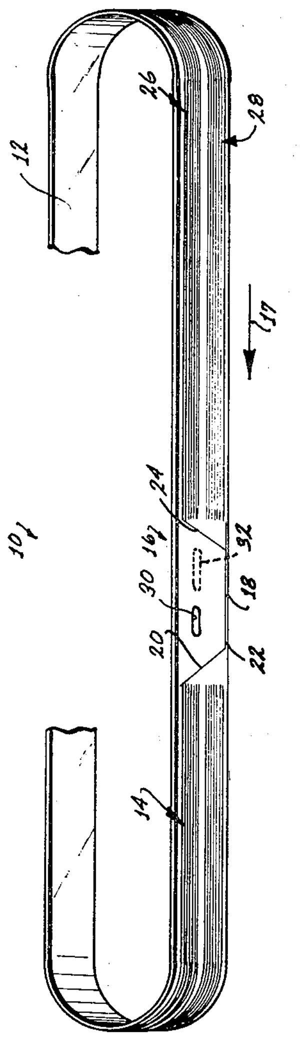
FIGURE 7 is a view of the record.
Figure 8:
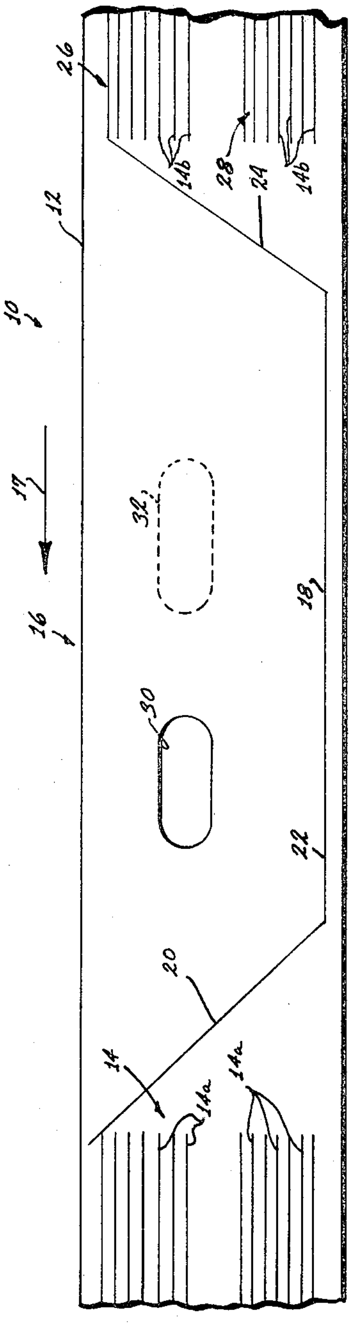
FIGURE 8 is an enlarged view of the record, with parts broken away, showing the guide track between the end and beginning of the plurality of the sound tracks.

Referring to FIGURES 7 and 8, a recorded message carrier means or record 10 is shown therein. The record 10 comprises an endless band 12 of such thickness and of such material that sound tracks 14 can be formed as grooves therein. Each of the individual sound tracks 14 extends around the entire outer surface of the band 12, except for a transition section 16, which extends from adjacent ends 14*a* of the sound tracks to adjacent the beginnings 14*b* of the sound tracks 14. Thus, the entire unseen outside portion of the band 12 at the top of FIGURE 7 has the sound tracks 14 extending there around, each sound tracks 14 being approximately parallel to and separated from the next except for transition section 16. Furthermore, the sound tracks 14 are of sufficient depth that a sound pickup means including a stylus (to be hereinafter described) can be guided thereby. The sound tracks 14 have information recorded therein so that, when the record 10 is moved at a proper speed in the direction of arrow 17, a stylus in any one of the tracks or grooves 14 is set in vibration by this recorded information and, when the stylus is connected to a suitable sound reproducer, the recorded information will be heard as audible sound. Furthermore, preferably each of the sound tracks 14 carries a different presentation thereon so that different sounds are heard when the stylus moves relatively with respect to different sound tracks.

If desired, sound tracks 14 can be divided into first and second groups 26 and 28. Alternatively, the sound tracks 14 may be equally spaced across the width of band 12.

Guide track 18 (FIG. 8) is preferably of smooth sided nature so that no sound is reproduceable from that portion of the track. Guide track 18 is positioned in the transition section 16 to extend between positions adjacent the ends 14*a* and the beginnings 14*b* of the several sound tracks 14. Guide track 18 has a leadout section 20 extending laterally across all the ends 14*a* so that when the stylus leaves the end of any sound track 14, it enters the leadout section 20. Leadout section 20 is connected to straight section 22. In turn, straight section 22 is connected to leadin section 24 which also extends laterally across all the beginning ends 14*b* of each of the sound tracks 14. The relative shape of the grooves of leadin section 24 and sound tracks 14 is such that the stylus preferentially stays in leadin section 24 until the stylus hits a lateral stop, (to be hereinafter described) and at that point it runs from leadin section 24 into the nearest sound track 14.

Within the "open space" between leadout section 20 and leadin section 24, physical detection means is provided to permit the playback mechanism to determine the presence of the transition section on the record 10. In the present embodiment, the physical detection means is an opening or aperture 30 perforated through band 12 in the transition section 16. Additionally, if desired, a further opening 32 can be perforated through the band 12 to make sure that the playback mechanism detects the transition section.

Figure 1:
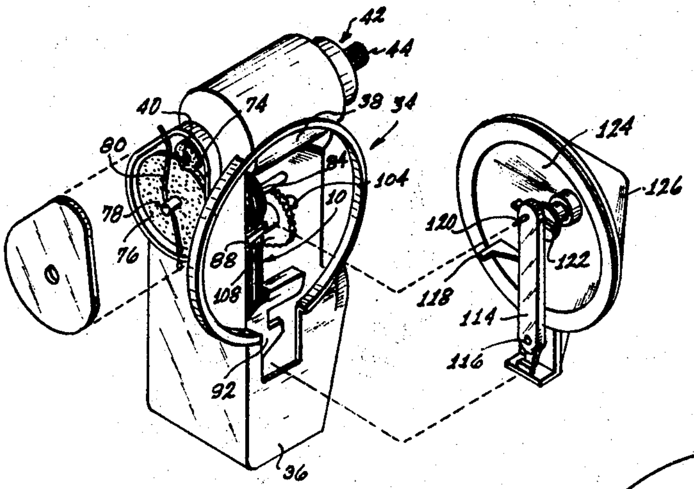
FIGURE 1 is an exploded isometric view of a record and random playback mechanism of this invention.
Figure 5:
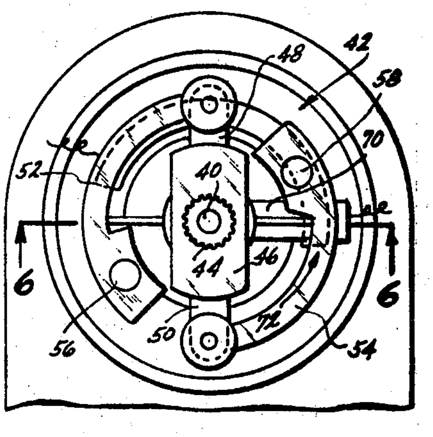
FIGURE 5 is an enlarged view of the right end of the motor as seen in FIGURE 2, showing the governor mechanism.
Figure 2:
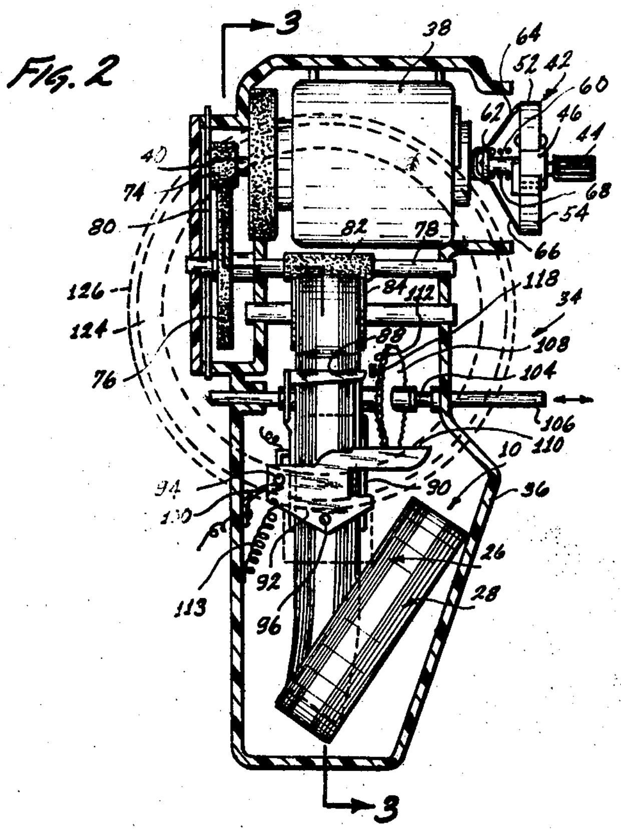
FIGURE 2 is an enlarged section therethrough, parallel to the plane of the motor axis.
Figure 6:
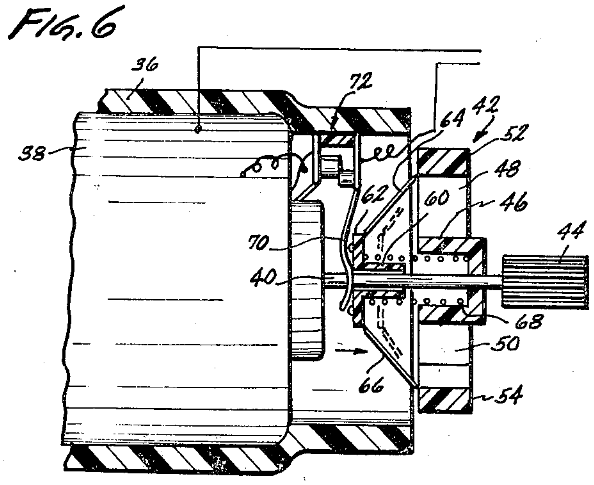
FIGURE 6 is a section taken generally along the line 6—6 of FIGURE 5.

The playback mechanism is generally indicated at 34 in FIGURES 1 and 2. The playback mechanism comprises frame 36 in which is mounted drive motor 38. Drive motor 38 is an electric motor which has an output shaft 40. The speed of drive motor 38 is regulated by governor 42 which is mounted upon output shaft 40. Governor 42 includes pinion 44 which is fixed to shaft 40 for rotation with the shaft. Hub 46 is integrally formed with pinion 44 and carries arms 48 and 50. Governor links 52 and 54, respectively, are pivoted on the ends of arms 48 and 50, and have weights 56 and 58 at their outer ends. The free ends of the governor links 52, 54 are arranged to lie against the hub 46 when the governor is at rest. As is seen in FIGURES 2 and 6, sleeve 60 is slidably mounted upon shaft 40 and carries an enlarged head 62 thereon. Head 62 is connected to governor links 52 and 54 by connectors 64 and 66, respectively. Compression spring 68 biases head 62 into engagement with an electrical contact arm 70 which closes switch 72 which is in series with the electric motor energization circuit.

Rotation of motor shaft 40 above a pre-determined rotative speed swings the governor weights outwardly, causing connectors 64 and 66 to move head 62 to the right. This releases the pressure on the switch contact 72 to result in breaking of the motor circuit, until it slows down. Governor weights 56 and 58 then again swing inwardly to permit electric contact closure of switch 72 to maintain the motor's speed at the desired rotative rate. By this means the rotative speed is maintained substantially constant.

The output of motor 38 can be, by means of pinion 44, arranged to drive any convenient mechanism. However, the record drive of the playback mechanism is operated by means of friction wheel 74 (FIG. 3) fixed to the other end of motor shaft 40. Friction wheel 74 is in frictional driving engagement with driven friction wheel 76 which is fixed to shaft 78. Shaft 78 is rotatably mounted in frame 36. A wire 80 is mounted in frame 36 and acts as a spring maintaining proper normal forces between friction wheels 74 and 76; and between a capstan roller 82 and record 10.

Figures 3, 4:
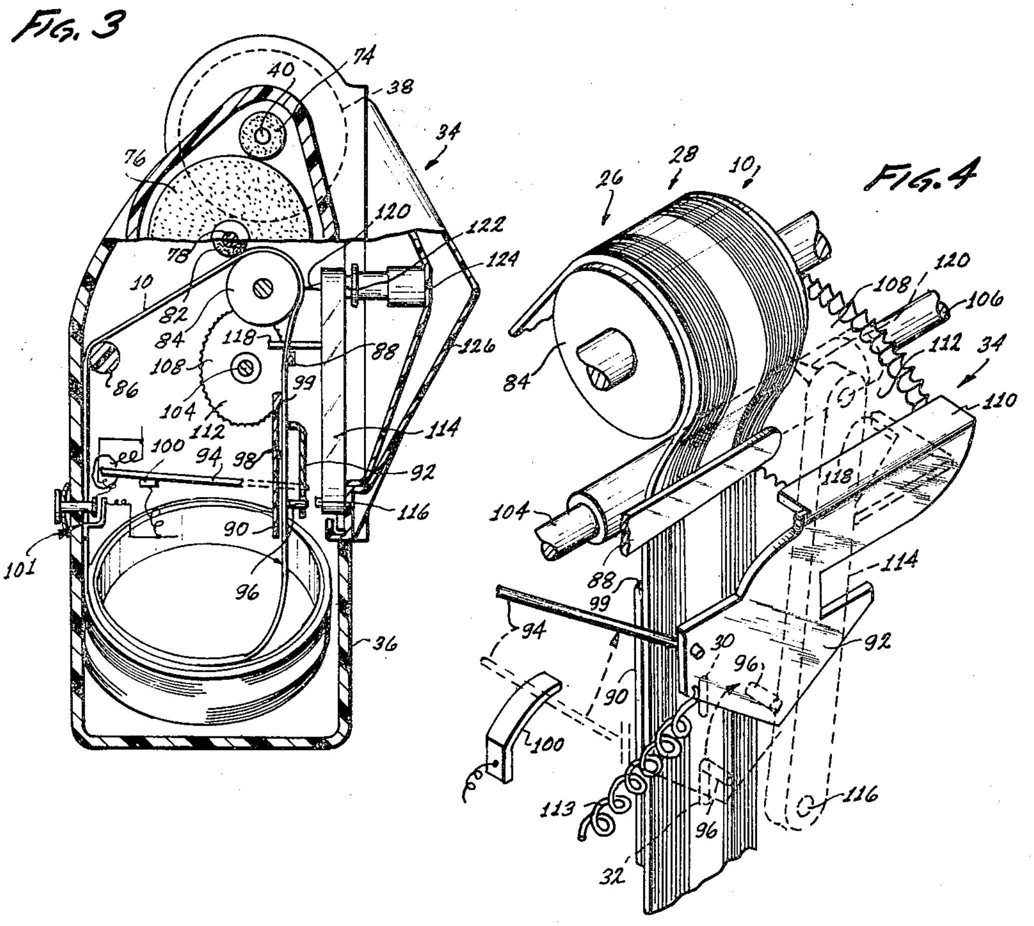
FIGURE 3 is an enlarged section through the structure of FIGURE 1 with parts broken away, taken generally along the line 3—3 of FIGURE 2.
FIGURE 4 is an enlarged isometric view of the mounting of the record in the random playback mechanism, and particularly showing the random playback structure.

Capstan roller 82 is fixed on shaft 78 and faces record carrier roll 84. As is seen in FIGURES 2, 3 and 4, record 10 is mounted over record carrier roll 84 and extends downwardly into the bottom of frame 36 to lie in an endless coil therein. Guides 86 and 88 engage around the record 10 to maintain it in proper position for proper playback.

Guide plate 90 is positioned below guide 88 in such a location that the record 10 passes over the entire length of the guide plate. If desired, edge guides may be formed on the guide plate, or on the adjacent structure. Pawl plate 92 is positioned over the record 10 and over guide plate 90. Pawl plate 92 is pivoted to the frame by means of link 94 so that it can move upward and downward with respect to guide plate 90 as is seen in FIGURES 2, 3 and 4. The lower position is shown on FIGURES 2 and 3, while the upper position is shown in full lines in FIGURE 4, with the lower position shown in phantom dot dash lines. Pawl plate 92 carries pin 96 which is so positioned that it engages within an aperture 30 or 32 of the record, as the aperture proceeds up the guide plate. Furthermore, a groove 98 is formed in guide plate 90 so that the pin 96 enters groove 98 when it passes through one of the openings 30 or 32. The upper end of the groove 98 is formed with a cam ramp 99 which pushes the pin 96 out of aperture 30, 32 in the record when pawl plate 92 is moved to the upper position.

Link 94 is formed as a part of an electric circuit to drive motor 38, and acts in association with a switch contact 100, which is mounted upon the frame 36, to control the operation of motor 38. The circuit is completed when a spring 113, which acts as a bias spring to urge pawl plate 92 downward and urge its pin 96 into one of the openings 30 or 32, pulls the pawl plate 92 to its lower position during the running of the major portion of the record 10. The pawl plate 92 is moved to the raised position shown in fill lines in FIGURE 4 when the transition section 16 of the record comes into the area of guide plate 90. Thus, link 94 and switch contact 100 act as a holding circuit which continues drive power to motor 38 during the entire playing of one revolution of record 10. As an additional electrical element, a momentary contact switch 101 is paralleled across the switch comprised of link 94 and contact 100 so that closing of the momentary contact switch 101 starts motor 38 driving record 10 until the transition section 16 has passed the area of guide plate 92. The switch comprised of link 94 and contact 100 then maintains the operation of the motor until a revolution of the record 10 has taken place.

Shaft 104 is mounted in frame 36 in such a manner that it can be moved axially through the frame from one detented position to another. One end of it extends from frame 36 to form handle 106 for manual engagement. Rotatably mounted upon shaft 106, but axially fixed thereto is ratchet wheel 108. Ratchet wheel 108 has an angular face 112 on its side toward record 10 which angular face acts as a face cam. A ratchet 110 is formed as a part of ratchet plate 92 and is positioned so that each time ratchet plate 92 is moved to its raised position, ratchet 110 engages with ratchet wheel 108. Ramp 99 then pushes pin 96 out of aperture 30, or 32, as the case may be, so that a spring 113 may rapidly return plate 92 to its original position. This spins the ratchet wheel 108 so that it stops at a new random position. Thus, the cam face 112 on ratchet wheel 108 is moved to a new, random position.

Playback mechanism 34 includes a sound-pickup means having a tone arm 114 pivoted to the frame at 116. Tone arm 114 carries a cam follower 118 thereon. Tone arm 114 also has stylus 120 thereon, which stylus continually rides in one of the tracks on record 10. Thus, when the transition section is reached, the stylus 120 moves to the left most position, as seen in FIGURES 2 and 4, and this moves cam follower 118 away from cam face 112. During this same time, the ratchet wheel 108 is spun so that a new portion of the cam face is positioned adjacent cam follower 118. Now, when the record is again advanced, and the stylus moves down leadin section 24, at one point cam follower 118 will contact cam face 112 and the lateral movement of stylus will be stopped and it will then enter and follow the beginning of the nearest sound track 14.

Tone arm 114 carries a crossbar 122 which lies against a sound reproducing means or speaker cone 124. Thus, vibrations of the stylus, set in motion by the record, are transmitted from the record to speaker cone 124 where they are converted to sound to be heard. A grille-cone 126 is positioned over speaker cone 124 to serve as a protective cover therefor.

In the disclosed embodiment, the variation in height of cam face 112 is enough to permit the selection of any one of the sound tracks 14 in either the first group 26 or the second group 28 of such sound tracks. By engagement of handle 106, shaft 104 can be slid to its other terminal position so that the other of the first and second groups 26 and 28 can be reproduced. This permits the recordings on the record 10 to be divided into two groups of audio representations to be reproduced. For example, one of the first and second groups 26 and 28 can be songs while the other comprises sayings, or one group can be happy sayings while the other comprises sad sayings or any other combination. Thus, which of the two groups will be played is pre-determined, but within the group the sound track selection is completely random and is determined by the spinning of ratchet wheel 108.

Two openings 30 and 32 can be provided to make sure that the record stops at the transition point. If the inertia of the system is too large, one opening 30 may not be sufficient to permit it to come to a complete stop. Accordingly, the two openings 30 and 32 are preferably positioned sufficiently close to each other that pin 96 engages in the second opening 32 before link 94 contacts 100 so that two motions of the pawl plate can be accomplished without further motor energization. In addition, if desired, more than two such openings 30 and 32 can be provided, as is necessary to stop the record due to inertia of the driving system after the first opening 30 in the transition zone is reached.

This invention having been described in its preferred embodiment, it is clear that it is susceptible to numerous modifications and embodiments within the ability of those skilled in the art and without the exercise of the inventive faculty.

What is claimed is:

1. In combination with a phonograph playback device, a recorded message carrier, comprising:

- a phonograph record, said record having a plurality of separate sound tracks, each of said sound tracks having a beginning end and a terminal end;
- a leadout section extending across the terminal ends of a plurality of said sound tracks;
- a leadin section extending across the beginning end of each of said plurality of said sound tracks; and
- guide track means connecting said leadin section and said leadout section and defining a transition section, each of said sound tracks containing recorded information reproduceable in audible form.

2. The combination of claim 1 wherein said record is formed as an endless flexible band having edges and wherein said sound tracks are formed on a surface of said band between said edges.

3. The combination of claim 2 wherein said edges are substantially parallel and wherein said sound tracks are substantially parallel to said edges and are all formed on one side of said band.

4. The combination of claim 3 wherein said leadin section and said leadout section are formed as tracks angularly related to the edges of said band and said guide track means is formed substantially parallel to the edges of said band.

5. The combination of claim 4 wherein said guide track means is closer to one edge of said band than to the other edge.

6. The combination of claim 1 wherein said record carries signalling means, adjacent said guide track means cooperable with said playback means when said transition section reaches a predetermined position.

7. The combination of claim 6 wherein said signalling means is a physical means.

8. The combination of claim 7 wherein said record is an endless band and said signalling means is an aperture through said band.

9. The combination of claim 8 wherein said guide track means is formed adjacent one edge of said band and said aperture is formed between said guide track means and the other edge of said band.

10. The combination of claim 1 wherein said playback device comprises:

- record drive means for driving said record;
- a tone arm positioned to play back information recorded in said sound tracks, said tone arm being moveable to act upon different areas of said record; and
- tone arm random positioning means for positioning said tone arm at the beginning end of a randomly selected sound track.

11. The combination of claim 10 wherein said tone arm random positioning means is a randomly positionable cam, a cam follower on said tone arm, said cam follower acting against said randomly positionable cam to act as a stop for said tone arm in its movement.

12. The combination of claim 11 wherein said record is provided with a hole and wherein said playback device includes a moveable pawl, a pin attached to said pawl, said pawl being moveable with respect to said cam and engageable with said cam so that motion of said pawl causes motion of said cam, said pin being engageable in the hole in the record to move the pawl.

13. The combination of claim 12 wherein said pawl and said pin are mounted on a pawl plate, resilient means acting on said pawl plate to urge said pawl to a stop-engaging position wherein said pawl is away from engagement with said cam.

14. The combination of claim 13 wherein a backing plate is positioned behind said pawl plate, a ramp is provided on said backing plate, said ramp being so related to said pin on said pawl plate that motion of said backing plate causes said pin to engage said ramp and urge said pin out of engagement with said hole in said record.

15. The combination of claim 14 wherein said record drive means includes an electric motor and an electric switch means, said switch means being connected to said pawl plate and to said motor so that said switch means is closed when said pawl plate is in said stop-engaging position.

16. The combination of claim 12 wherein said cam is shiftable from a position where it exercises control of said tone arm through a first range of control to a position where it exercises control of said tonee arm through a second range of control.

References Cited

UNITED STATES PATENTS

| | | | |
|---|---|---|---|
| 3,388,911 | 6/1968 | Wilson et al. | 274—4 |
| 3,370,855 | 2/1968 | Lindsay | 274—1 |
| 3,069,570 | 12/1962 | Abadie | 179—100.2 |
| 2,262,732 | 11/1941 | Gruber | 274—42 |

LEONARD FORMAN, Primary Examiner

R. A. FIELDS, Assistant Examiner

U.S. Cl. X.R.

274—9, 43